(12) United States Patent
Osborne

(10) Patent No.: US 7,142,741 B2
(45) Date of Patent: Nov. 28, 2006

(54) LASER CUTTING METHOD AND APPARATUS FOR OPTICAL FIBRES OR WAVEGUIDES

(75) Inventor: Michael Osborne, Ickenham (GB)

(73) Assignee: Iruvis Limited (GB)

( * ) Notice: Subject to any disclaimer, the term of this patent is extended or adjusted under 35 U.S.C. 154(b) by 60 days.

(21) Appl. No.: 10/399,858

(22) PCT Filed: Oct. 25, 2001

(86) PCT No.: PCT/GB01/04751

§ 371 (c)(1),
(2), (4) Date: Oct. 3, 2003

(87) PCT Pub. No.: WO02/34452

PCT Pub. Date: May 2, 2002

(65) Prior Publication Data

US 2004/0047587 A1    Mar. 11, 2004

(30) Foreign Application Priority Data

Oct. 25, 2000  (GB) .................................. 0026129.7
Dec. 7, 2000   (GB) .................................. 0029914.9

(51) Int. Cl.
*G02B 6/00*   (2006.01)
*G02B 6/26*   (2006.01)

(52) U.S. Cl. ........................ 385/15; 385/33; 385/134; 385/147; 65/387

(58) Field of Classification Search ................ 385/15, 385/33; 65/387, 407
See application file for complete search history.

(56) References Cited

U.S. PATENT DOCUMENTS

| | | | | |
|---|---|---|---|---|
| 4,710,605 A | * | 12/1987 | Presby | 219/121.69 |
| 5,256,851 A | * | 10/1993 | Presby | 219/121.69 |
| 5,850,300 A | * | 12/1998 | Kathman et al. | 359/9 |

FOREIGN PATENT DOCUMENTS

| | | |
|---|---|---|
| EP | 0391598 A1 | 10/1990 |
| EP | 0558230 A1 | 9/1993 |
| EP | 0803747 A2 | 10/1997 |
| EP | 0987570 A1 | 3/2000 |
| EP | 1022593 A1 | 7/2000 |
| WO | WO-93/08491 | 4/1993 |

\* cited by examiner

*Primary Examiner*—Michelle Connelly-Cushwa
(74) *Attorney, Agent, or Firm*—Connolly Bove Lodge & Hutz LLP

(57) ABSTRACT

A cutting method and apparatus are provided to cut a portion of an optical fibre or waveguide with a laser beam. The proposed cutting action takes advantage of the sharp cutting edge of a laser beam generated so as to have a predetermined asymmetric intensity distribution. In operation, a prescribed amount of the beam distribution is impinged on the fibre or waveguide portion and causes the portion to ablate or vaporise so as to effect a cut at the portion in dependence upon the impingement. No translation of the laser beam across the fibre or waveguide is effected during cutting. The proposed cutting action bears definite advantages over conventional cutting techniques and finds utility for many optical fibre or waveguide applications. For example, the proposed cutting action can produce a substantially flat optical fibre or waveguide surface or a lens of enhanced quality at the end of the fibre or waveguide portion.

32 Claims, 10 Drawing Sheets

Flared end to fibre (a)

(b)

Region of Diffused core

Cut 1 — Significant deposited energy & hence thermal effects — 35, Fibre, 37

Subsequent cuts — 36 — Vast majority of beam passes by end face of fibre (Top Schematic)

Cut 1 — Significant deposited energy & hence thermal effects — Fibre — 35'

Subsequent cuts — Vast majority of beam passes by end face of fibre — 36'

(Bottom Schematic)

LASER CUTTING METHOD AND APPARATUS FOR OPTICAL FIBRES OR WAVEGUIDES

FIELD OF THE INVENTION

This invention relates to a laser cutting method and apparatus and more particularly, but not exclusively, concerns a cutting method and apparatus utilising a laser in optical fibre and optical waveguide applications.

BACKGROUND OF THE INVENTION

The state of the art to which the present invention relates is presented hereinafter in three parts, namely, in relation to: (1) the known technique of mechanical cleaving of optical fibres and optical waveguides, (2) the known techniques for producing lens-shapes on optical fibres, and (3) the known techniques for cutting optical fibres with a laser.

1. Mechanical Cleaving of Optical Fibres and Waveguides

The structure of a typical optical fibre is shown in FIG. 1 of the accompanying drawings. In a number of applications in fibre-optic communications it is necessary to couple light either into or out of optical fibres or waveguides. Sometimes this is accomplished using connectorised fibres where the fibre is attached into a ferrule and then polished to provide an optical quality surface with the end of the fibre lying approximately flush with the end of the ferrule. However, in other applications, the fibre is not connectorised. In these cases, mechanical cleaving of optical fibres is the accepted technique for preparing the ends of the fibre. This is also the case when the ends of the fibre need to be prepared prior to mechanical or fusion splicing.

Mechanical cleaving involves producing a fiducial stress-raising mark on the periphery of the fibre (typically with a diamond blade), and then snapping the fibre from the mark. When carried out correctly, this leaves a high quality, flat surface across the vast majority of the end of the fibre, including across the crucial core region.

In many applications it is required to minimise the optical reflection from the end face of the fibre or waveguide back into the fibre or waveguide. This can be achieved by angling the end face of the fibre or waveguide (as shown in FIG. 1) so that the back-reflected light is reflected away from the core. The greater the angle, the less light is coupled back into the core of the fibre or waveguide. Typically angles of 6–8° are used which are close to the limit of what can be obtained with a degree of reliability in mass production.

In the interests of increasing the component density in opto-electronic devices, however, laser sources which emit vertically (normal to the plane of the chip rather than parallel to it, see FIGS. 2(a) and (b)) are being developed. Coupling the light from these sources into optical fibres or waveguides presents a challenge to conventional techniques, but can be accomplished using total internal reflection form an end face cleaved at approximately 45° to the fibre or waveguide axis as shown in FIG. 2(b).

Mechanical cleaving has a number of disadvantages and limitations. Firstly, it produces very sharp edges on the corner of thee cleaved (cut) fibre. These are susceptible to handling damage, particularly if the fibre is to be inserted longitudinally into another component.

In some cases these sharp edges are removed in a second process, for example by introducing the tip of the fibre into a flame.

Secondly, the range of angles which mechanical cleaving can achieve is limited. Devices relying on stressing the fibre during the cleave process (either by twisting the fibre or by applying a shearing stress) result in an angle on the cleaved end but in practice this is restricted to <10°. Angles of close to 45° required for coupling light into the fibre or waveguide from vertical emitting lasers by means of a reflection from the end face of the fibre or waveguide (see FIG. 2) cannot be achieved. Moreover, the reproducibility of the cleave angle is less than is called for in many applications, with ±0.5° being difficult to maintain in mass production whereas ±0.2° is often desired.

Thirdly, as mechanical cleavers depend for their operation on precision moving parts including a very sharp blade, they are prone to wear and misalignment, requiring more readjustment and refurbishment than is ideal for mass production.

Fourthly, the mechanical cleave process, involving such precise and intimate contact between the cleaver and the fibre, is inherently difficult to automate. Such a non-automated process requires considerable manpower resources to produce large volumes, and the yield is dependent on operator skill which leads to product variability.

Fifthly, the size of the hardware involved in the mechanical cleave means that is not possible to cleave very close to other objects. For example, cleaving cannot generally be carried out closer than about 10 mm from a ferrule or connector.

Further, mechanical cleaving cannot produce the very tight fibre-to-fibre cut length tolerances required of ribbon fibres, where tolerances of ±2 μm or less are required.

2. Producing Lens-Shapes on Optical Fibres and Waveguides

Increasing data traffic is placing ever greater demands on the performance of optical communications systems. These include capacity, bandwidth and distance between amplifiers or repeaters.

Crucial to meeting the above objectives is to maximise the efficiency of the whole system. This not only reduces the power consumed and/or allows the use of fewer amplifier/repeaters, but results in less waste heat and hence thermal loading of the components. This reduces the thermal management hardware needed, permits tighter packaging of components, and allows the active devices to be operated at lower temperatures, which has a significant beneficial effect on component lifetimes.

One significant source of inefficiency in a pig-tailed transmitter or pump laser is the coupling of the emitted laser power into the attached fibre. The problem here is to couple the divergent optical output from the laser diode, which will have an effective source size of a few microns and usually different beam divergences in the two orthogonal dimensions, into the (usually) circularly symmetric core of an optical fibre or waveguide which, for a single mode fibre or waveguide, will be between 3 and 20 μm in diameter, or may be up to 62 μm or more for multi-mode fibre or waveguides.

The optical transfer from the source to the fibre or waveguide is often accomplished using micro-optics inserted between the two components as shown in FIG. 2(c). The production and alignment, assembly and subsequent permanent fixturing of these discrete components is problematic. For reasons of availability and ease of alignment, the lenses are often spherical and symmetric, although it is clear that aspheric, asymmetric lenses would provide superior performance.

Producing a lens-shape directly on the end of the optical fibre or waveguide can reduce the alignment difficulties by avoiding the need for the additional (aligned) component. Various techniques for manufacturing such a lens have been described, including etching, selective etching (where the cladding is selectively removed and the core then etched), grinding, pulling the fibre in the presence of a heat source (usually an electric arc) and laser micro-machining.

The laser route has a number of advantages in terms of speed, flexibility and reproducibility.

The use of a $CO_2$ laser to machine lens shapes on optical fibres by means of a micro-lathe approach has been described in a number of patents (for example, see U.S. Pat. No. 4,710,605, EP 0 391 598 B, EP 0 558 230 B). In these patents, the laser is focused to a spot, which is then scanned across the end of the rotating fibre, providing a machining approach which is analogous to a conventional mechanical lathe.

This approach introduces a significant heat input into the fibre. This results in a re-flow of material which is influenced by surface tension effects. The net result is a smoothing of fine detail and a tendency toward smoothly curved and ultimately near-spherical surfaces. For the purposes of these patents, this is a largely helpful phenomenon when producing relatively gently curved lenses with tip radii (assuming the spherical case) in excess of 10 μm. However, production of radii less than 10 μm is problematic with the micro-lathe technique.

Moreover, in practice the technique is relatively slow (of order 15 s per fibre), and tends to "flare" the fibre, causing the fibre outside diameter (OD) to locally increase beyond the nominal 125 μm, as shown in FIG. 3(a). This is a severe disadvantage if it is wished to passively align the fibre to an active device (say a laser source) by laying the fibre in a v-groove (FIG. 3(b)). In such an application, the tolerance on alignment is typically of order 0.3 μm, and so even 1 μm levels of flare have a significant detrimental effect.

In addition, the significant thermal input in the process described above can result in diffusion of the dopant which defines the core and hence the active region of the fibre (see FIG. 4). This core diffusion can have a deleterious effect on the optical performance of the lens.

Furthermore, the significant thermal input can cause severe problems when machining polarisation maintaining (PM) fibre, which typically have asymmetrically distributed inserts of a different or doped material within the fibre to provide stress directions and hence the PM axis. This different material will generally have different thermal properties to the surrounding quartz, in particular it will melt and re-solidify at a different (usually lower) temperature. If the laser lensing process produces a significant melt region, as the micro-lathe does, the effects of different parts of the end face of the fibre re-solidifying at different times can severely distort the overall surface form.

3. Cutting of Optical Fibres with a Laser

The use of lasers to cut optical fibres has also been described. U.S. Pat. No. 5,421,928 (Siecor Corporation) describes a method in which a focussed laser beam is used to cut excess optical fibre protruding from a ferrule prior to polishing, and EP 0 987 570 A (The Whitaker Corporation) describes a process in which a focussed laser beam is translated across a fibre in order progressively to cut through the fibre (a similar technique is disclosed in U.S. Pat. No. 4,932,989).

OBJECTS AND SUMMARY OF THE INVENTION

The principal object of the present invention is to overcome or at least substantially reduce some at least of the abovementioned problems.

It is an object of the present invention also to provide an improved laser cutting method which is precise, reliable and reproducible during operation for optical fibre and optical waveguide applications.

It is also an object of the present invention to provide a simple, robust, and cost-effective route to laser machining fibres employing no moving parts and the smallest laser size practicable.

It is another object of the present invention also to provide an improved laser cutting method which is capable of achieving one or more of a reduction in the volume of molten fibre or waveguide material produced, a low interaction time to substantially prevent thermal conduction/diffusion effects, a low fibre or waveguide end flare, a sharp cutting action and a high local laser intensity at the fibre portion or waveguide to be cut.

Further, it is another object of the present invention also to provide an improved method of forming a lens on optical fibre or waveguide which is precise and reliable, and which is capable of achieving in a controllable manner one or more of low thermal conduction/diffusion effects, a low optical absorption depth of laser in the fibre or waveguide material, a sharply curved lens-shape (for example, with a tight lens tip radius), a fast processing of the fibre or waveguide material, a low fibre or waveguide end flare and a low core diffusion.

In broad terms, the present invention in one of its aspects resides in the concept of taking advantage of the sharp cutting edge of a predetermined laser beam intensity profile to provide a controllable ablation and vaporisation of selected optical fibre or waveguide material, such ablation and vaporisation enabling a cutting action of the type which meets the aforementioned objects to be effected.

Therefore, according to a first aspect of the present invention there is provided a method of cutting a portion of an optical fibre or waveguide with a stationary laser beam, the method comprising: generating a beam of laser light with a predetermined intensity distribution which exceeds, in one dimension, the width of the fibre or waveguide, aligning said beam distribution in relation to a portion of an optical fibre or waveguide to permit an amount of said beam exceeding a predetermined level of intensity to impinge on said portion to be cut; and cutting said portion in dependence upon the impingement of said beam on said portion so as to form a substantially flat optical fibre or waveguide surface of enhanced quality.

According to a second aspect of the present invention, there is provided a method of forming a lens at an end portion of an optical fibre or waveguide with a stationary laser beam, the method comprising: generating a beam of laser light with a predetermined intensity distribution; aligning said beam distribution in relation to an end portion of an optical fibre or waveguide to permit an amount of said beam exceeding a predetermined level of intensity to impinge on said end portion; and cutting said end portion in dependence upon the impingement of said beam on said end portion so as to form a lens of enhanced optical quality at said end portion.

The present invention also extends to an apparatus adapted and arranged to carry out the aforementioned methods, said apparatus comprising: means for generating a beam of laser light with a predetermined intensity distribution; means for aligning said beam distribution in relation to a portion of an optical fibre or waveguide to permit an amount of said beam exceeding a predetermined level of intensity to impinge on said portion to be cut; and means for cutting said portion in dependence upon the impingement of said beam on said portion so as to form an optical fibre or waveguide surface of enhanced quality, for example a substantially flat optical surface or a lens of enhanced quality at said portion.

In yet another of its aspects, the present invention resides in the concept of utilising means other than focussing of the laser beam to provide the desired sharp cutting edge of a predetermined laser beam intensity profile, enabling a cutting action of the type which meets the aforementioned objects to be effected.

More particularly according to this aspect of the present invention there is provided a method of cutting a portion of an optical fibre or waveguide with a laser beam, the method comprising: generating a beam of laser light with a predetermined intensity distribution other than by focussing, aligning said beam distribution in relation to a portion of an optical fibre or waveguide to permit an amount of said beam exceeding a predetermined level of intensity to impinge on said portion to be cut; and cutting said portion in dependence upon the impingement of said beam on said portion.

This aspect of the present invention also extends to an apparatus adapted and arranged to carry out the aforementioned method, said apparatus comprising: means for generating a beam of laser light with a predetermined intensity distribution other than by focussing, means for aligning said beam distribution in relation to a portion of an optical fibre or waveguide to permit an amount of said beam exceeding a predetermined level of intensity to impinge on said portion to be cut; and means for cutting said portion in dependence upon the impingement of said beam on said portion.

Conveniently, by utilising means other than focussing of the laser beam, high intensity laser cutting beam distributions well suited to the cutting process can be produced. In this connection, the desired generated beam distribution can be formed by optical interference, imaging or diffraction or by a combination of such techniques.

Having regard to the foregoing, it is to be appreciated that the method(s) and apparatus of the aforementioned aspects of the invention have definite advantages over known cutting methods and apparatuses; for example, the method(s) and apparatus of the invention address the limitations of the mechanical cleaving (cutting) route.

First, and more particularly, the laser cutting action of the invention produces fibre or waveguide corners which are rounded, and therefore, are more robust.

Secondly, the angle of the cut/cleave is governed by simple geometric considerations between the fibre or waveguide and the cutting laser beam, and so can reach large angles (certainly >45°). Moreover, the cut/cleave angle reproducibility reflects the reproducibility of this geometry, and can easily better the ±0.5 degree of reproducibility obtained by mechanical cutters/cleavers and indeed the ±0.2 degree of reproducibility specified in some applications.

Thirdly, as the laser route is a non-contact process, there are no blades or mechanically stressed moving parts to wear out or become misaligned.

Fourthly, being non-contact, the laser cutting action of the invention is inherently suited to automated loading and unloading of the fibre or waveguide.

Fifthly, as the cutting is carried out by the laser beam itself and the hardware is remote from the cutting point, the cut can be positioned very close to other components, certainly <1 mm.

Sixthly, precision stepping methods exist through which the cutting beam can be stepped from fibre to fibre in a ribbon, giving fibre-to-fibre cut/cleave length variations of <1 µm.

Further, the laser cutting of the present invention combines several techniques designed to reduce the undesirable thermal effects of the conventional laser micro-lathe approach. These include, as mentioned previously, minimising the volume of molten material produced, keeping the overall interaction time as short as possible to prevent thermal conduction/diffusion and fibre or waveguide flaring, minimising the optical absorption depth of the laser radiation in the material, using the sharpest feasible "cutting edge" to the laser beam, and employing constructive interference to enhance the local laser intensity, thereby allowing shorter interaction times.

Advantageously, keeping the quantity of molten material produced during all stages of the interaction to a minimum minimises the undesirable effects of the re-flow of this melted volume. It also minimises the potential transport of the fibre or waveguide dopant from the core region into the cladding (refer to FIG. 4). Note also that keeping the laser interaction time to a minimum reduces the thermal conduction from the region which is directly heated by the laser into other parts of the fibre or waveguide, thereby reducing the overall thermal impact.

Further, the lens forming method of the present invention combines several techniques designed to reduce the undesirable thermal effects inherent in the conventional laser micro-lathe approach, allowing, as previously mentioned, the achievement of tighter tip radii, faster processing, minimising fibre flare and core diffusion, and providing the ability to handle polarisation maintaining (PM) fibre. It also avoids the need to move the laser beam into and through the optical fibre as specified in EP 0 391 598 B1 for example.

The above and further features of the invention are set forth with particularity in the appended claims and will be described hereinafter by reference to exemplary embodiments shown in the accompanying drawings.

DETAILED DESCRIPTION OF THE EMBODIMENTS

Figure 1:
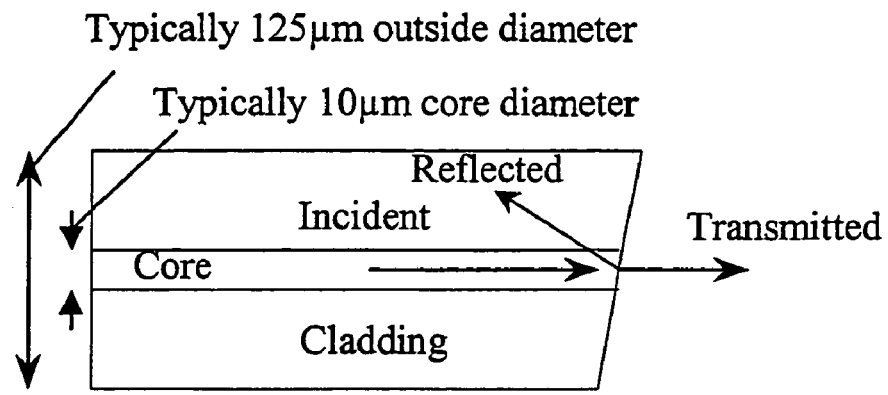
FIG. 1 shows a conventional optical fibre structure with an angled end face to back-reflect light away from the fibre core.
Figure 2:
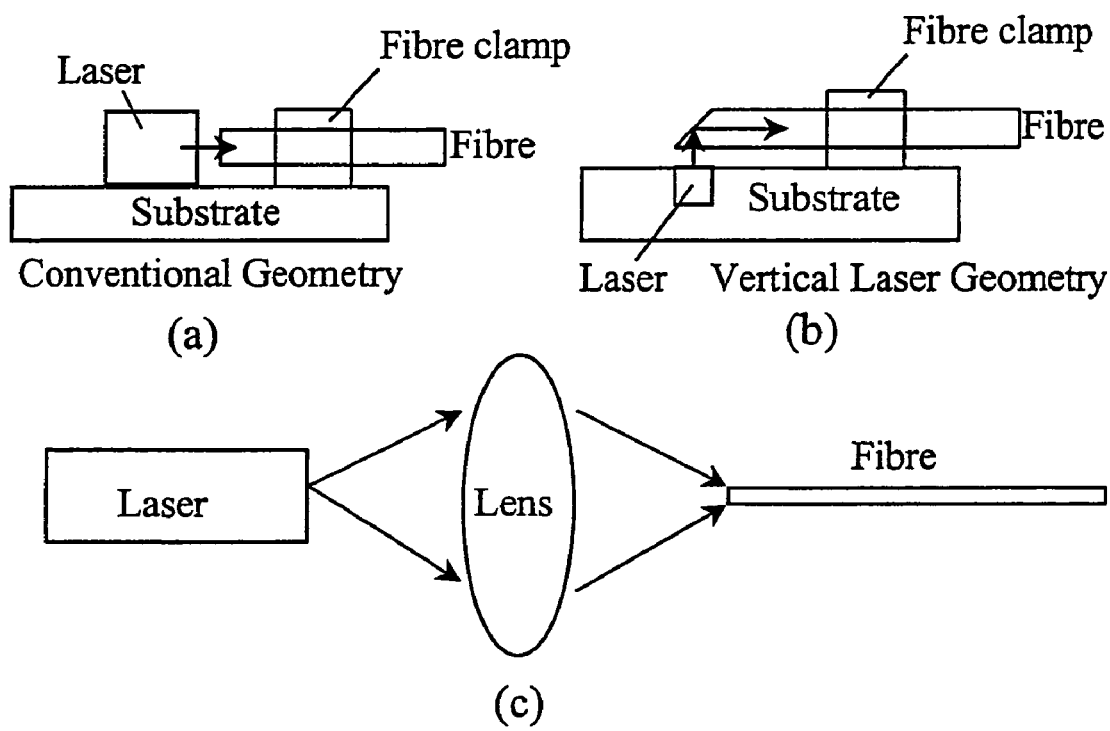
FIG. 2 shows three conventional laser-to-optical fibre geometries in which (a) the laser source emits light parallel to the longitudinal axis of the fibre, (b) the laser source emits light vertically, normal to the longitudinal axis of the fibre and (c) the laser source and the fibre are optically coupled by means of a lens which can be formed directly on the end of the fibre.
Figure 3:
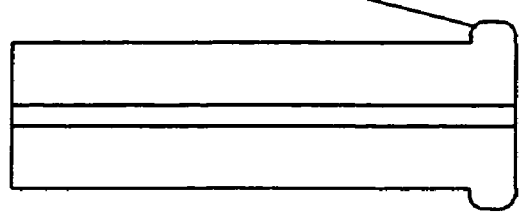
FIG. 3(a) shows an optical fibre with an increased outside diameter (flare) produced by conventional laser machining treatment and FIG. 3(b) shows the problem of aligning the fibre of FIG. 3(a) in a v-shaped groove in relation to an active source, a laser for example.
Figure 3:
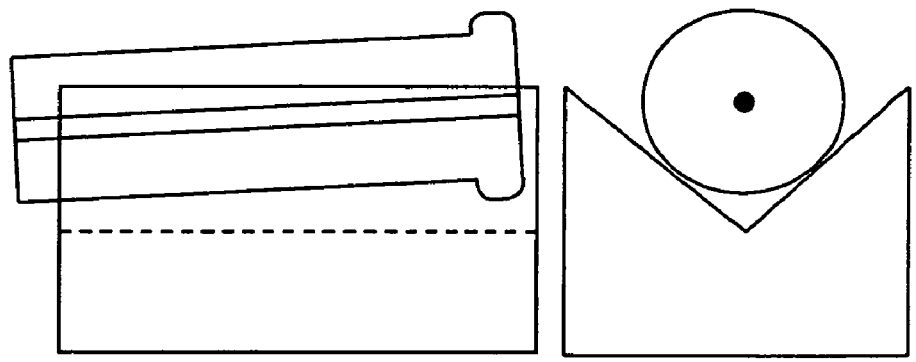
Figure 4:
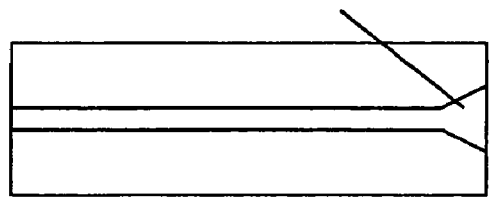
FIG. 4 shows the fibre of FIG. 3 with an unwanted amount of fibre dopant diffusion from the core region into the cladding resulting from conventional laser cutting of the fibre.
Figure 5:
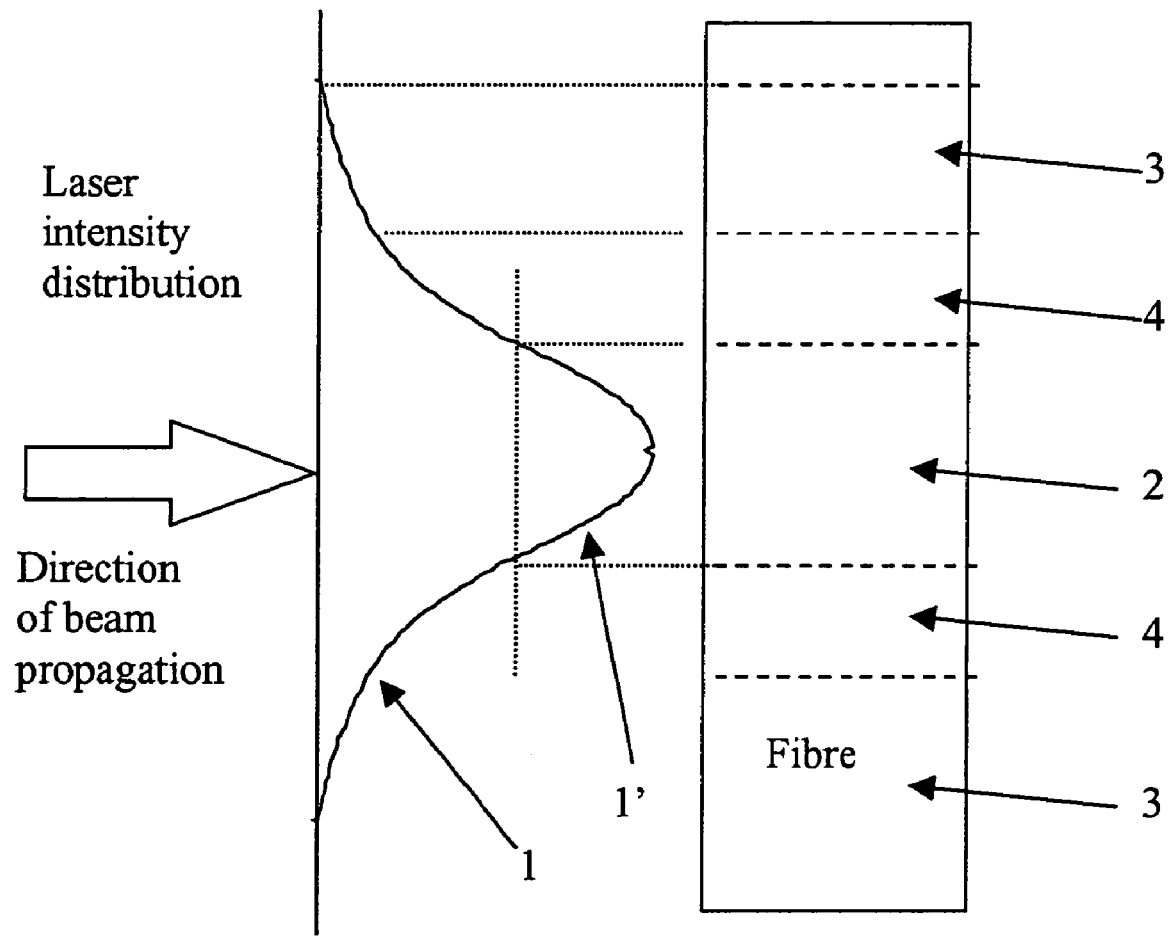
FIG. 5 shows, in schematic form, how a cutting action according to an aspect of the present invention is effected having regard to the relative alignment between a laser having a predetermined intensity distribution and the optical fibre region to be cut.

FIG. 5 illustrates, in schematic form, how the cutting action of a method of the invention is effected on a portion of optical fibre or waveguide so as to form an optical fibre or waveguide surface of enhanced quality. More specifically, as shown, the cutting action is affected by impinging an amount 1' of a predetermined laser intensity distribution 1, for example in the form of a Gaussian intensity distribution 1, onto a section 2 (to be cut) of fibre or waveguide material 3 in alignment therewith and ablating or vaporising the fibre or waveguide section 2. Regions 4 of the fibre, adjacent to the fibre section 2, are further subjected to significant levels of heating in dependence upon the impingement, the regions 4 being heated to an appropriately significant level below the fibre or waveguide material's vaporisation point.

Advantageously, the laser cutting procedure of the invention does not involve the production of a mark on the fibre periphery and then mechanical fracture of the fibre as required by the conventional cleaving technique. Note also that in the method of the invention, to reduce/minimise the amount of molten fibre or waveguide region 4 adjacent to the vaporised region 2, the laser beam is absorbed within a thin layer of the fibre or waveguide material 3, and the laser beam profile 1 is arranged to have the sharpest possible cutting "edge". in operation of the method of the invention, a $CO_2$ laser (not shown) is preferably used to generate the laser-beam profile, and advantageously, the $CO_2$ laser wavelength is changed to 9.4–9.8 µm from the more usual 10.6 µm to permit the optical absorption in the quartz of the fibre or waveguide to be increased by almost an order of magnitude, resulting in a corresponding decrease in the optical absorption depth.

Figure 6:
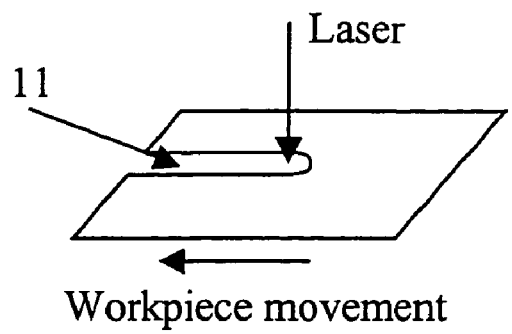
FIG. 6 shows a conventional laser cutting geometry in which a laser incision is made in a moving workpiece to produce a slot/cut.

Turning next to FIG. 6, there is shown, for comparison purposes, a conventional laser cutting arrangement in which a cut is performed on a workpiece 10 by using a laser focus to provide a laser "incision" in the workpiece 10 and then moving either the laser focus or the workpiece to translate this incision producing a narrow slot or cut 11, as is shown in FIG. 6. This is analogous to the use of a jig-saw in woodworking. This approach can lead, however, to significant thermal input. The present invention is different in principle to this mode of operation, and uses an asymmetric laser beam profile to perform the cutting. This more closely resembles the use of a chisel in the woodworking analogy, and results advantageously in a much more rapid process, leading to a significantly reduced thermal impact.

Figure 7A:
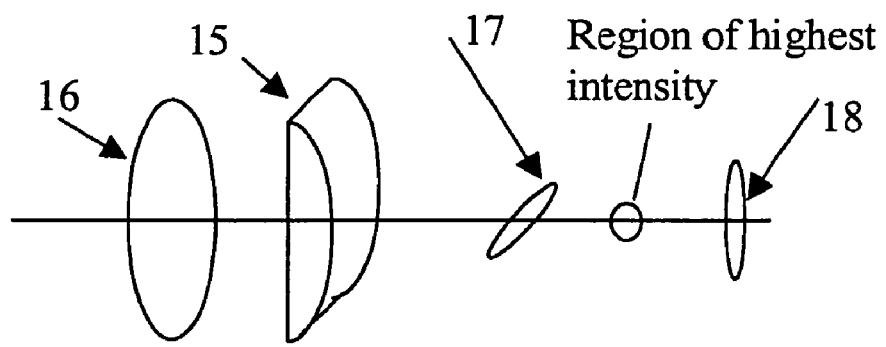
FIG. 7(a) shows, schematically, a conventional optics-geometry for producing a line-focus laser beam with the beam focussed in two different axial positions in orthogonal axes
Figure 7B:
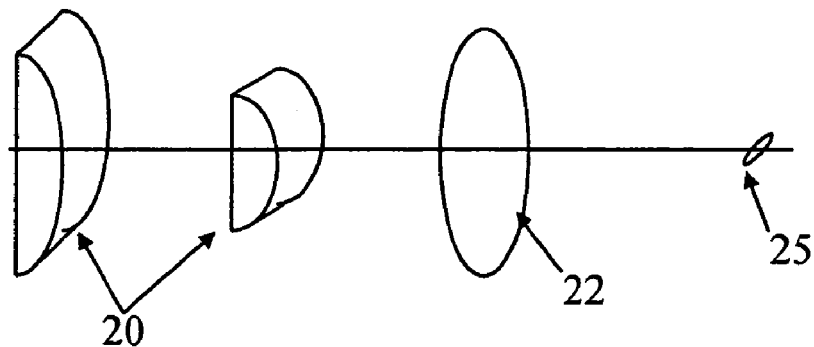
FIG. 7(b) shows, schematically, a typical optics-geometry of the invention for producing a high intensity asymmetric line-focus beam at one axial position.

The most common route to produce an asymmetric laser beam is to incorporate a single cylindrical element 15 in the optical train, often combined with conventional circularly-symmetric (spherical or aspheric) optics 16. This indeed produces a line-focus, however the beam is focused in different axial positions 17, 18 in orthogonal axes as shown in FIG. 7(a), leading to a focal intensity not as high as is possible. In order to reach higher intensity a cylindrical telescope can be used to expand or contract the laser beam in one dimension only. As is shown in the embodiment of FIG. 7(b), a cylindrical telescope 20 is combined with a symmetric (spherical or aspheric) focussing optic 22, and the resulting different numeral aperture in two axes produces a single high intensity line focus 25 ideally suited to laser cutting. Moreover, as the focus in the two orthogonal axes remains in the same position along the propagation axis with this arrangement, the intensity in the focal line is maximised. This yields the highest optical intensity, with the sharpest "edge" to the beam allowed by free-space Gaussian beam propagation, and allows the shortest possible interaction time to be used which reduces heat conduction, melt depth and hence reduces flaring and core diffusion.

Figure 8:
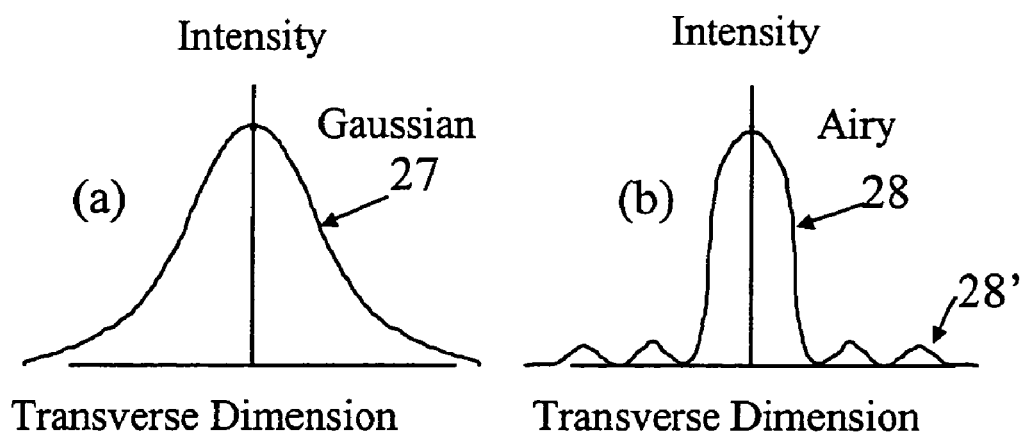
FIG. 8 shows two types of predetermined laser intensity distribution for use in the invention, namely (a) a Gaussian intensity distribution and (b) an Airy-type intensity distribution.
Figure 9:
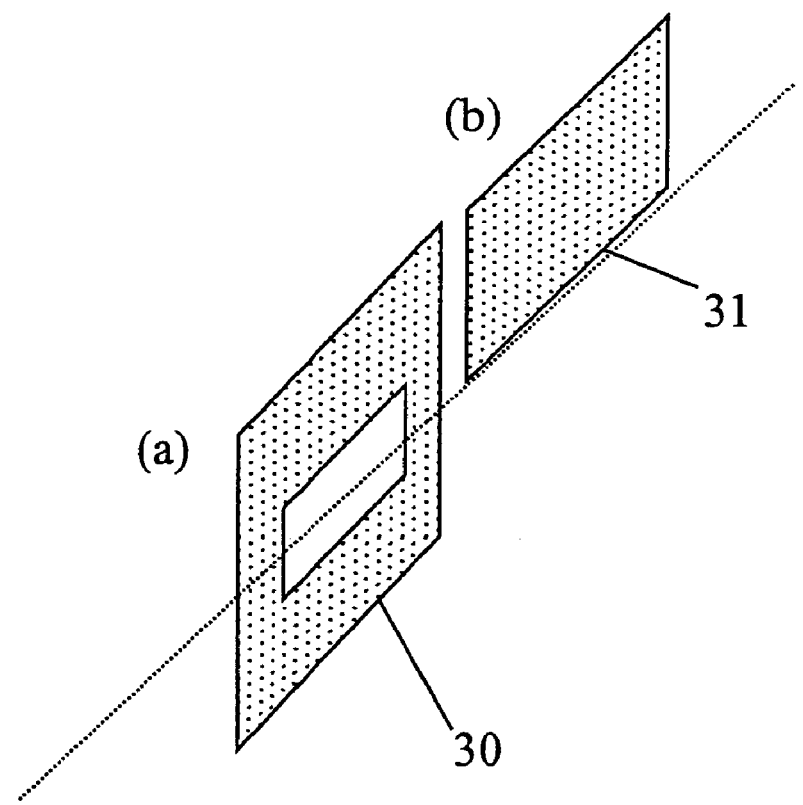
FIG. 9 shows two types of mask geometry namely, (a) a rectangular mask and (b) a knife-edge mask for use in the practice of the present invention.

It is appreciated that the laser cutting of the invention is carried out by appropriate apparatus using the edge of the incident predetermined laser power density distribution (see also FIG. 5). It is possible to sharpen this edge beyond the limits which Gaussian optics would generally impose by employing a mask to aperture the beam. This results in an Airy-type power density distribution 28 having sharper edges (albeit with additional diffraction structure 28') as shown in one dimension in FIG. 8. A Gaussian power density distribution 27 is also shown in FIG. 8 for comparison. Further, the essentially 1-D geometry of the laser cut means that a mask with different properties in two orthogonal dimensions is most appropriate. Preferably a rectangular mask 30 is used as shown in FIG. 9. An alternative possibility, giving a somewhat modified focal distribution, is to use a single sided mask, for example a knife-edge 31, and that kind of mask is also shown in FIG. 9.

Figure 10:
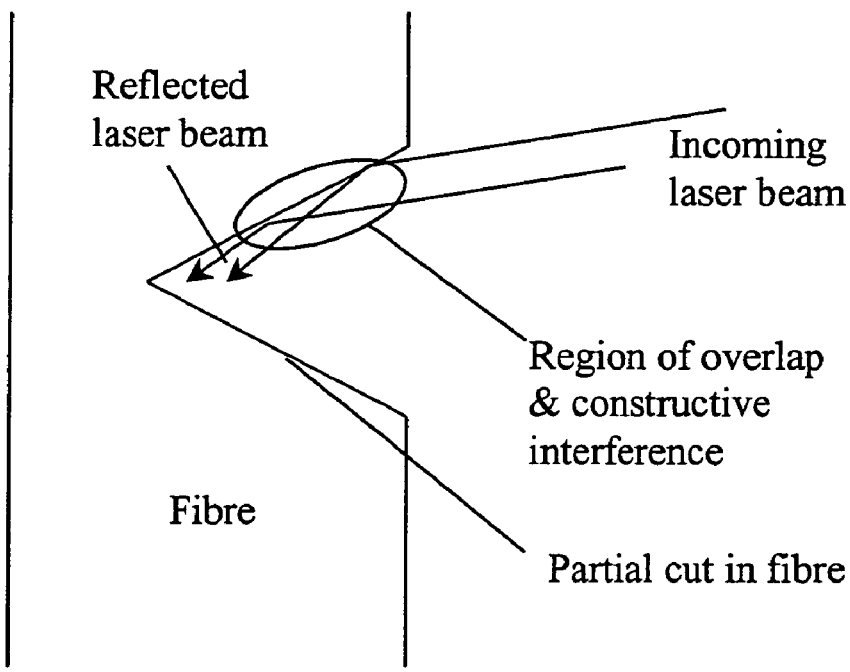
FIGS. 10(a) and (b) show, schematically, how the local laser beam intensity at the fibre portion to be cut may be enhanced by means of constructive interference between reflected and non-reflected parts of the laser beam.
Figure 10B:
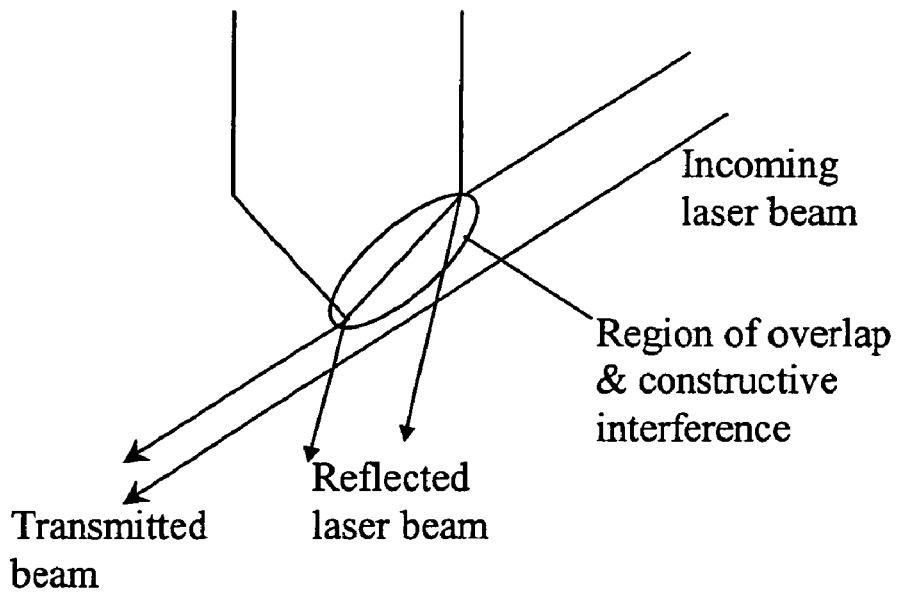

To further maximise the local intensity at the fibre or waveguide to be cut, the laser beam may be caused to propagate in such a direction that the partially cleaved (cut) fibre or waveguide reflects the laser beam in such a way that the reflected beam constructively interferes with the non-reflected part of the beam. This effect is illustrated in FIGS. 10(a) and 10(b). In this way, the local amplitude is doubled (assuming perfect reflection), resulting in a four-fold increase in the local intensity. This requires that the polarisation of the laser beam is parallel to the cut surface (rather than perpendicular) and that the angle of incidence (as measured from the normal top the surface) is less than a critical angle at which a $\pi(180°)$ phase shift occurs on reflection of the beam.

Figure 11A:
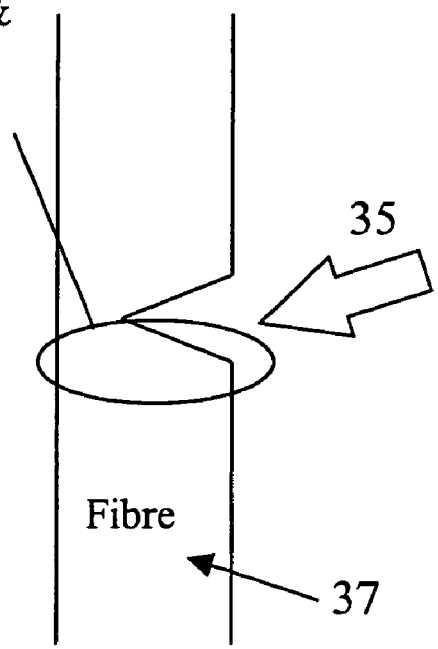
FIGS. 11(a) and (b) show, schematically, how a cutting action may be effected in accordance with the present invention by means of a number of successive cutting steps so as to reduce the thermal loading on the fibre to be cut.
Figure 11A:
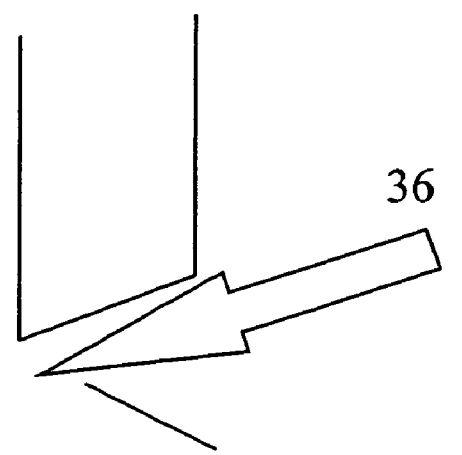
Figure 11B:
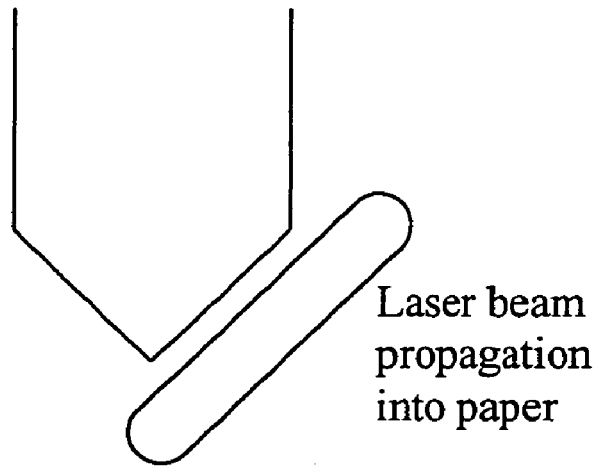
Figure 11B:
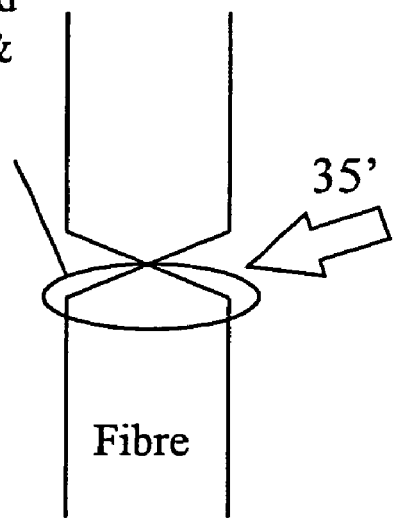
Figure 11B:
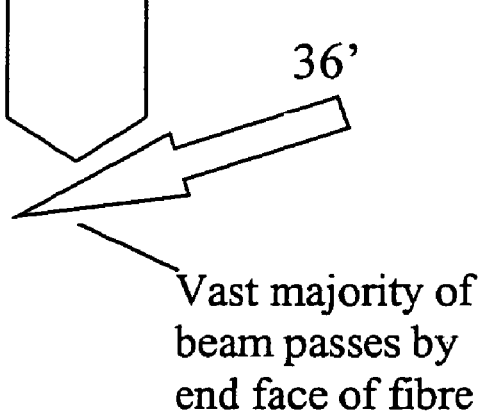

The thermal loading on the fibre or waveguide is advantageously reduced by allowing all but the cutting edge of the laser beam to pass by the fibre or waveguide in use. This is achieved by carrying out the laser cut(s) in accordance with the aforementioned geometry of FIGS. 10(a) and 10(b), as opposed to the alternative approach shown in FIG. 11(b) (top schematic) where the laser beam propagation is shown to be directed into the plane of the paper. The thermal loading on the fibre or waveguide can still further be advantageously reduced by utilising the geometry of FIGS. 11(a) and 11(b) (bottom schematic). As shown, in these figures, a preliminary laser cut 35, 35' (cut 1) in the normal described way is performed on the fibre or waveguide portion 37, 37' to be treated, and thereafter, one or more subsequent laser cuts 36, 36' are performed, there being slight relative movement (not shown) between the fibre or waveguide and the laser beam along the longitudinal axis of the fibre or waveguide between successive cuts.

Advantageously, the laser cutting procedure of the invention provides a high intensity beam with the sharpest possible cutting edge, enabling core diffusion and fibre flaring to be minimised and producing the most accurate cut end on the fibre. It is to be appreciated that, whereas with simple focussing, a Gaussian intensity distribution is the best likely distribution to be achieved, the intensity distribution for use in the present invention may advantageously be produced by means other than by focussing, for example by imaging, optical interference or diffraction, or by a combination of such techniques. Further, it is to be noted that the laser cutting of the invention is carried out by appropriate apparatus using the cutting edge of the generated laser power density distribution.

Figure 12:
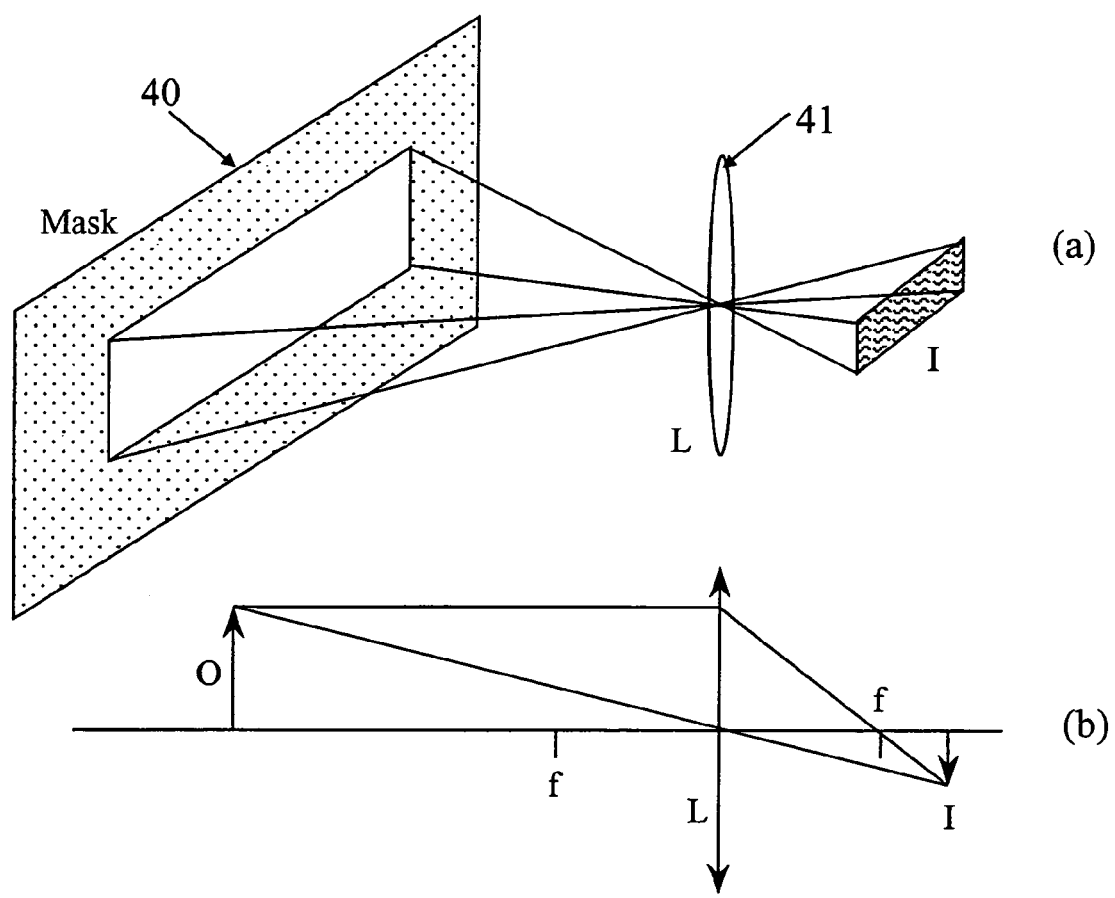
FIG. 12 shows schematically (a) a rectangular mask geometry for use in the invention and (b) how the mask geometry of (a) is used to produce an increase in the laser beam intensity on the fibre by optical demagnification.

Turning next to FIG. 12, an advantageous laser intensity distribution for use in the practice of the present invention may be produced by imaging a rectangular mask 40 in the image plane by use of a lens 41. As shown, the arrangement provides optical demagnification of the laser beam in order to increase the local intensity of the laser beam on the fibre to be cut. The present invention, in this aspect, is therefore different in principle to conventional modes of operation, and uses a laser beam profile with a sharp cutting edge, produced by means other than by focussing, to perform the cutting. This more closely resembles the use of a chisel in the woodworking analogy, and results advantageously in a much more rapid process, leading to a significantly reduced thermal impact.

Figure 13:
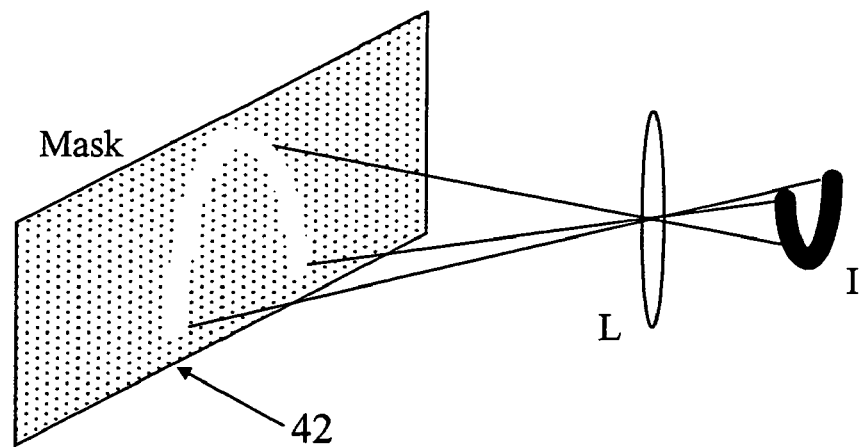
FIG. 13 shows schematically a curved mask geometry for use in the practice of the invention to produce an optical lens structure on the end of the fibre.

FIG. 13 shows a different mask geometry from that of FIG. 12 for use in the present invention. More particularly, as shown, a mask geometry with a curve-shaped cut 42 is used to provide a varying level of light transmission such as to permit a particular optical structure such as a lens to be formed on the end of a fibre. Note that the intensity distribution in the image (machining) plane is altered by the way in which the object (mask) is illuminated by the laser, which need not be uniform.

Figure 14:
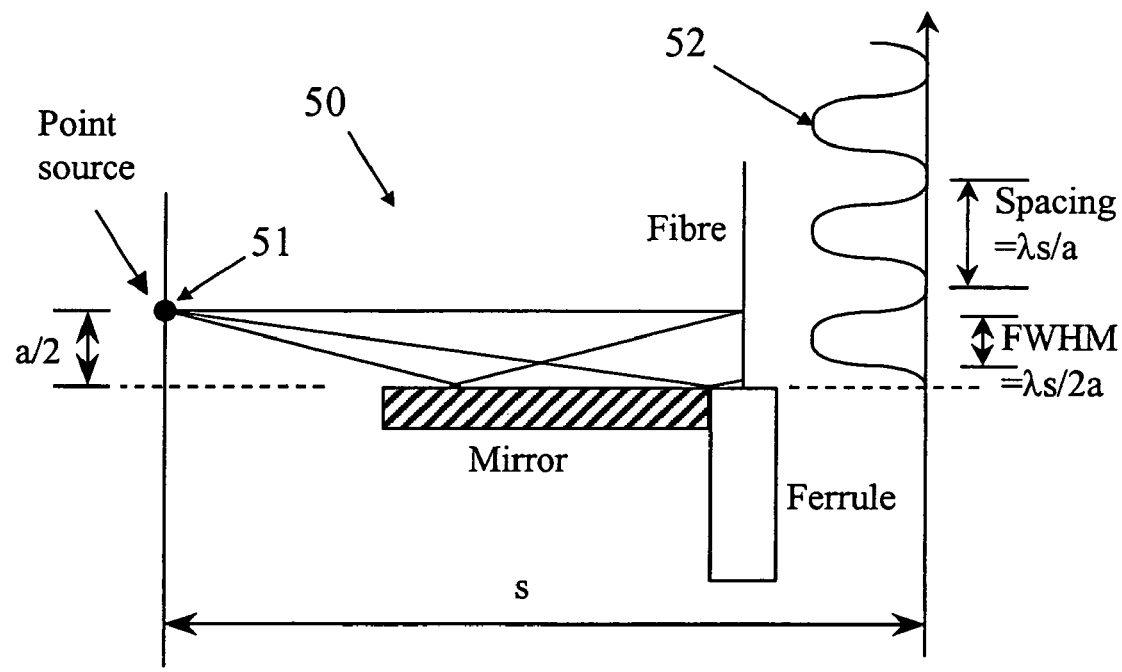
FIG. 14 shows schematically an optical interference geometry for use in the practice of the invention for producing a high local laser beam intensity.

FIG. 14 shows another optical arrangement of the present invention in which optical interference is used to produce the high local intensity desired. As shown in the figure, an optical interference arrangement 50 similar to the so-called Lloyds Mirror in classical optics is used. This is used with a point/slit source 51 and gives rise to a number of parallel fringes 52. For the purposes of the present invention, it may be used to produce the high local intensities desired. With correct control over the divergence of the laser beam (and/or the effective source size), the majority of the photons are advantageously concentrated into the first fringe, with little energy wasted in the higher order fringes. The resulting intensity pattern is highly concentrated, yielding the high intensities required.

Other wavefront-splitting interferometers (not shown) are known in classical optics which produce fringe patterns similar to the Lloyd's mirror arrangement, and which are similarly adapted to optical fibre cutting in accordance with the present invention. These include Fresnel's double mirror arrangement, Young's slits arrangement and Fresnel's Bi-prism arrangement.

In another optical arrangement (not shown) of the present invention the constructive interference of phase-shifted beams is used to produce the required local high intensity. This phenomenon is known in classical optics, but has not been employed in laser machining. Diffraction of the cutting beam using phase masks, zone plates and/or echelle gratings is envisaged so as to effect fibre cutting in accordance with the present invention.

Having regard to the foregoing, the laser cutting action proposed by the present invention finds utility for various optical fibre or waveguide applications. In this connection, it permits a selected region of an optical fibre or waveguide to be cut in a controlled fashion enabling various cut angles ($\leq$to >45 degrees) to be formed in the fibre or waveguide, and as described above, it can be successfully applied to optical fibre or waveguide to form, for example, (1) a substantially flat optical fibre or waveguide surface of enhanced optical quality or (2) a lens of enhanced optical quality at said region. The laser beam during the cutting operation is kept at a stationary position in relation to the fibre or waveguide.

Having described the invention by reference to specific embodiment, it is to be well understood that the embodiments are exemplary only and that modifications and variations thereto will occur to those possessed of appropriate skills without departure from the spirit and scope of the present invention as set forth in the appended claims. For example, whereas the described embodiment of the invention uses a Gaussian or Airy-type (non Gaussian) laser intensity distribution, the same or similar technical effect might be obtainable by using a different kind of non-Gaussian laser intensity distribution having a sharp cutting edge. Also, the laser source need not be a $CO_2$ laser as in the described embodiment and could alternatively be a UV-excimer laser. The invention can also be applied to different optical fibre or waveguide structures where a sharp cutting action is required. It is also to be appreciated that a very wide range of laser intensity distributions might be produced using different kinds of masks having different forms and shapes. Different masks having varying levels of transmission can be used to produce the same or similar technical effect.

The invention claimed is:

1. A method of cutting a portion of an optical fibre or waveguide with a laser beam, the method comprising:
   generating a beam of laser light having a predetermined intensity distribution which is wider than the width of the fibre or waveguide at the point of contact between the laser beam and fiber or waveguide,
   aligning said beam distribution in relation to a portion of said optical fibre or waveguide to permit an amount of said beam exceeding a predetermined level of intensity to impinge on said portion to be cut; and
   cutting said portion in dependence upon the impingement of said beam on said portion so as to form a substantially flat optical fibre or waveguide surface of enhanced quality.

2. A method as claimed in claim 1, wherein said cutting is effected by ablating or vaporising said portion and heating adjacent portions of the fibre or waveguide.

3. A method as claimed in claim 1, wherein the generated beam distributed comprises an asymmetric beam.

4. A method as claimed in claim 3, wherein asymmetric beam is formed by use of cylindrical telescope means.

5. A method as claimed in claim 1, wherein said predetermined intensity distribution is a Gaussian intensity distribution.

6. A method as claimed in claim 1, wherein said predetermined intensity distribution is an Airy-type intensity distribution.

7. A method as claimed in claim 1, wherein said impingement of the beam on said portion is effected in a manner to permit constructive interference between reflected and non-reflected parts of said beam.

8. A method as claimed in claim 1, further comprising effecting relative movement between said portion and the beam after a first cutting operation and thereafter performing a second cut.

9. A method as claimed in claim 8, wherein said relative movement comprises a small predetermined movement along the longitudinal axis of said fibre or waveguide.

10. A method as claimed in claim 8, further comprising cutting said portion a third or more time.

11. An apparatus adapted and arranged to carry out a method as claimed in claim 1.

12. An apparatus as claimed in claim 11 comprising:
means for generating a beam of laser light with a predetermined intensity distribution;
means for aligning said beam distribution in relation to a portion of an optical fibre or waveguide to permit an amount of said beam exceeding a predetermined level of intensity to impinge on said portion to be cut; and
means for cutting said portion in dependence upon the impingement of said beam on said portion so as to form an optical fibre or waveguide surface of enhanced quality.

13. An apparatus as claimed in claim 12, wherein said means for generating a beam of laser light is a $CO_2$ laser operable in the wavelength range between 9.4 μm and 10.6 μm.

14. The apparatus as claimed in claim 12, wherein said means for cutting forms a flat optical surface on said optical fibre or waveguide surface.

15. An apparatus as claimed in claim 12, wherein said means for generating a beam of laser light is a $CO_2$ laser operable in the wavelength range between 9.4 micrometers and 9.8 micrometers.

16. The apparatus of claim 12, wherein said means for cutting forms a lens on said optical fibre or waveguide surface.

17. A method of forming a lens at an end portion of an optical fibre or waveguide with a stationary laser beam, the method comprising:
generating a beam of laser light with a predetermined intensity distribution;
aligning said beam distribution in relation to an end portion of an optical fibre or waveguide to permit an amount of said beam exceeding a predetermined level of intensity to impinge on said end portion; and
cutting said end portion in dependence upon the impingement of said beam on said end portion so as to form a lens of enhanced optical quality of said end portion, wherein a width of the beam is sufficient for cutting to be effected without relative movement between the laser beam and the fibre or waveguide.

18. A method of cutting a portion of an optical fibre or waveguide with a laser beam, the method comprising:
generating by means other than focusing a beam of laser light having a predetermined intensity distribution that is wider than a width of the fibre or waveguide at a point of contact between said laser and fibre or waveguide;
aligning said beam distribution in relation to a portion of an optical fibre or waveguide to permit an amount of said beam exceeding a predetermined level of intensity to impinge on said portion to be cut; and
cutting said portion in dependence upon the impingement of said beam on said portion, wherein said cutting step is achieved without relative movement between the laser beam and the optical fibre or waveguide.

19. A method as claimed in claim 18, wherein said cutting is effected by ablating or vaporising said portion and heating adjacent portions of the fibre or waveguide at a predetermined level.

20. A method as claimed in claim 18, wherein the generated beam distribution is formed by imaging.

21. A method as claimed in claim 18, wherein the generated beam distribution is formed by interference.

22. A method as claimed in claim 21, wherein said generated beam distribution is formed by use of an optical interference Lloyd's mirror geometry, or by use of an optical interference Fresnel double mirror geometry, or by use of an optical interference Fresnel Bi-prism geometry, or by use of a Young slit's geometry.

23. A method as claimed in claim 18, wherein the generated beam distribution is formed by diffraction.

24. A method as claimed in claim 23, wherein said generated beam distribution is formed by use of mask means.

25. A method as claimed in claim 24, wherein said mask means comprises a phase mask or zone plate.

26. A method as claimed in claim 23, wherein said generated beam distribution is formed by use of an echelle grating.

27. A method as claimed in claim 18, wherein said generated beam distribution is formed by means of optical interference and/or imaging and/or diffraction.

28. An apparatus adapted and arranged to carry out a method as claimed in claim 18.

29. An apparatus as claimed in claim 28 comprising:
means for generating a beam of laser light having a predetermined intensity distribution other than by focusing;
means for aligning said beam distribution in relation to a portion of an optical fibre or waveguide to permit an amount of said beam exceeding a predetermined level of intensity to impinge on said portion to be cut; and
means for cutting said portion in dependence upon the impingement of said beam ion said portion.

30. An apparatus as claimed in claim 29, wherein said means for generating a beam of laser light is $CO_2$.

31. An apparatus as claimed in claim 30, wherein cutting of the optical fibre or waveguide is effected without translation of the laser beam across the fibre or waveguide.

32. A method of cutting a portion of an optical fibre or waveguide with a stationary laser beam, the method comprising:
generating a beam of laser light with a predetermined intensity distribution,
aligning said beam distribution in relation to a portion of a stationary optical fibre or waveguide to permit an amount of said beam exceeding a predetermined level of intensity to impinge on said portion to be cut; and
cutting said portion in dependence upon the impingement of said beam on said portion so as to form a substantially flat optical fibre or waveguide surface.

* * * * *